United States Patent [19]

Jaeschke

[11] 4,146,856
[45] Mar. 27, 1979

[54] SHUTTERLESS FIBER OPTIC SWITCH

[75] Inventor: James R. Jaeschke, Waukesha, Wis.

[73] Assignee: Cutler-Hammer, Inc., Milwaukee, Wis.

[21] Appl. No.: 865,435

[22] Filed: Dec. 29, 1977

[51] Int. Cl.² ............................................. H01H 51/06
[52] U.S. Cl. ...................................... 335/151; 335/154
[58] Field of Search ............... 335/151, 152, 154, 153;
340/365 P; 250/229, 231, 551

[56] References Cited

U.S. PATENT DOCUMENTS

| 3,235,741 | 2/1966 | Plaisance | 250/229 |
| 3,327,262 | 6/1967 | Bongard et al. | 335/154 |
| 3,535,664 | 10/1970 | Staar | 335/153 |
| 3,624,404 | 11/1971 | Hines | 250/231 |
| 3,886,544 | 5/1975 | Narodny | 340/365 P |
| 3,999,074 | 12/1976 | Callaghan | 250/551 |

Primary Examiner—George Harris

[57] ABSTRACT

A fiber optic reed switch is disclosed. A pair of fiber optic cables are mounted to the ends of cantilever reed arms by means of supports providing coaxial alignment of the cables upon closure of the reed arms to complete an optical circuit.

12 Claims, 2 Drawing Figures

SHUTTERLESS FIBER OPTIC SWITCH

BACKGROUND OF THE INVENTION

Fiber optic switches are known wherein a shutter is driven between the facing ends of a pair of fiber optic cables to break the light path therebetween. A disadvantage of these switches is that the width of the shutter physically limits the narrowness of the gap between the facing cable ends whereby a certain amount of transmission loss between the cables cannot be avoided due to the diverging cone of emitted light. Additionally, because of the shutter, the gap is not hermetically sealed, thus giving rise to further transmission losses due to optical contamination of the cable end faces.

SUMMARY OF THE INVENTION

The present invention relates to a fiber optic switch constructed to eliminate the necessity of a shutter.

An object of the invention is to provide a fiber optic switch of the aforementioned character having a narrower gap between facing fiber optic cable ends to minimize transmission losses therebetween.

Another object is to provide a fiber optic switch of the aforementioned character which is amenable to hermetic sealing of the gap to prevent contamination of the facing cable ends.

Another object of the invention is to provide a simple, low cost fiber optic switch having a minimum number of parts, versatile and numerous applications, and which is susceptible of numerous variations.

Another object of the invention is to provide conversion means for adapting a variety of existing electrical switch structures to optical switching applications.

Other objects and advantages will hereinafter appear.

DESCRIPTION OF THE PREFERRED EMBODIMENT

Figure 1:
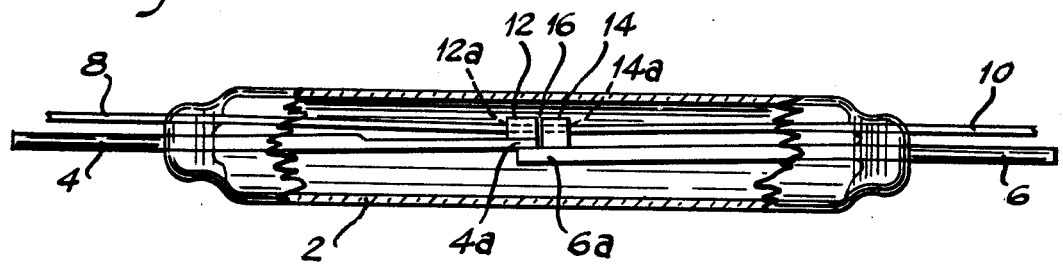
FIG. 1 shows a fiber optic reed switch as the preferred embodiment of a shutterless fiber optic switch constructed in accordance with the invention.

There is shown in FIG. 1 a reed switch comprising an elongated hermetically sealed glass envelope 2 having a pair of magnetically permeable reed arms 4 and 6 extending through and sealingly mounted to the distal ends of the envelope. The reed arms extend into the envelope in cantilever form and overlap at their inner ends 4a and 6a which provide stops for attraction of the reed arms under the influence of a magnetic field. In the absence of a magnetic field, the reed arms return to their normal separated position due to their inherent bias.

Sealingly extending through the distal ends of the envelope are also a pair of fiber optic cables 8 and 10. Support members 12 and 14 mount the ends of cables 8 and 10 to the inner ends 4a and 6a of the reed arms such that the fiber optic cables are aligned upon closure of the reed arms whereby to complete an optical circuit.

Support member 12 is attached to the top of reed arm 4 at end 4a. Support member 14 is attached to the top of reed arm 6 and spaced slightly from end 6a to allow clearance of end 4a upon closure. Each of the support members has a bore 12a, 14a, extending therethrough for rigidly securing a respective fiber optic cable end disposed therein. The support members are constructed such that the height of bore 14a above the top surface of reed arm end 6a is equal to the height of bore 12a above the top surface of reed arm end 4a plus the vertical thickness of reed arm end 4a.

The disclosed embodiment thus eliminates the need for a shutter, hence enabling a narrower gap 16 between the facing fiber optic cable ends, whereby to reduce transmission losses therebetween.

Figure 2:
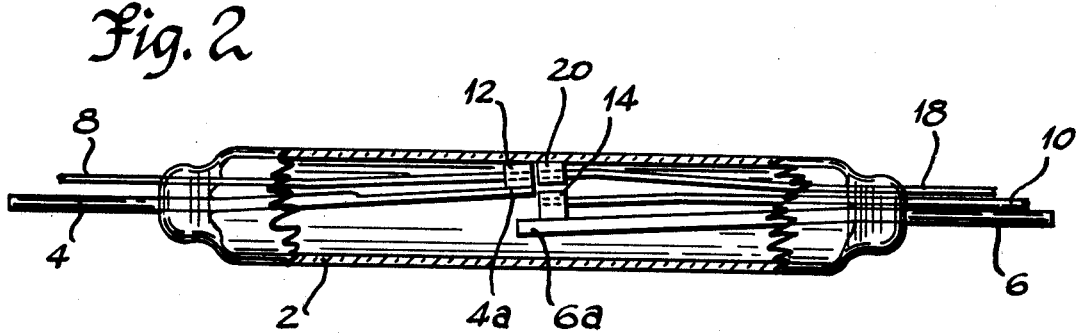
FIG. 2 shows a "double throw" type switch as an alternate embodiment of FIG. 1.

FIG. 2 shows an alternate embodiment wherein a third fiber optic cable 18 sealingly extends into the envelope and has an inner end rigidly secured in support member 20 which is attached to the envelope wall. In the normal separated position of reed arms 4 and 6, support member 12 abuts the envelope wall acting as a stop, and cables 8 and 18 are aligned to thus complete an optical circuit therealong.

Among other possible modifications are the inclusion of bimetal strips along the underside of reed arms 4 and 6 within the envelope to provide movement thereof in response to temperature, and hence a temperature to light switch.

The concepts and teachings herein are of course applicable to other areas in the switch art within the scope of the appended claims.

I claim:

1. A shutterless fiber optic switch comprising:
   actuation means comprising first and second members at least one of which is movable between actuated and unactuated positions;
   first and second fiber optic cables;
   alignment means comprising first and second support means
   mounting respectively said first and second fiber optic cables to said first and second members such that in said actuated position said cables are colinearly aligned in facing end to end relation to permit transmission of light therebetween thus forming a closed optical circuit, and such that in said unactuated position said cables are misaligned to prevent transmission of light therebetween.

2. The switch according to claim 1 wherein one of said first member and said first support means is stopped against one of said second member and said second support means when said at least one member is in said actuated position to afford accurate alignment of said fiber optic cables.

3. The switch according to claim 2 wherein the coaxis of said fiber optic cables is perpendicular to the line of travel of said at least one member, said first support means mounting said first fiber optic cable at a distance D1 spaced in the direction of said line of travel from said first member, said second support means mounting said second fiber optic cable at a distance D2 spaced in the direction of said line of travel from said second member such that in said actuated position the distance between said second fiber optic cable and said first member in the direction of said line of travel is substantially equal to D1.

4. The switch according to claim 3 wherein said first member is stopped against said second member in said actuated position, and wherein D2 substantially equals D1 plus the thickness of said first member.

5. A fiber optic reed switch comprising:
   first and second cantilever reed arms and mounting means therefor, said reed arms extending toward each other and having free proximate ends actuatable between reciprocated positions upon flexure of at least one of said reed arms;

first and second fiber optic cables; and alignment means comprising first and support members mounted respectively to said free proximate ends of said first and second reed arms and rigidly securing respective fiber optic cable ends to provide coaxial alignment thereof and complete an optical circuit through the gap therebetween when said reed arms are in one of said reciprocated positions;

one of said first reed arm and said first support member being stopped against one of said second reed arm and said second support member when said reed arms are in said one of said reciprocated positions;

said second support member spacing said second fiber optic cable from said second reed arm such that the distance between said second fiber optic cable and said first reed arm in said one of said reciprocated positions is equal to the spacing between said first fiber optic cable and said first reed arm provided by said first support member.

6. The switch according to claim 5 wherein said at least one of said reed arms is magnetically permeable whereby to afford magnetic actuation of said switch.

7. The switch according to claim 5 wherein said at least one of said reed arms includes bimetal means whereby to afford thermal actuation of said switch.

8. The switch according to claim 5 wherein said first reed arm is stopped against said second reed arm in said one of said reciprocated positions, the distance between said second fiber optic cable and said second reed arm provided by said second support member being equal to the distance between said first fiber optic cable and said first reed arm provided by said first support member plus the thickness of said first reed arm.

9. The switch according to claim 5 further comprising a third support member mounted to said mounting means and securing a third fiber optic cable such that said first and said third fiber optic cables are coaxially aligned upon flexure of said first reed arm to the other of said reciprocated positions.

10. A fiber optic reed switch comprising:

a hermetically sealed envelope;

first and second magnetically permeable cantilever reed arms sealingly mounted at opposite ends of said envelope and extending thereinto, the inner ends of said reed arms being reciprocal between actuated and unactuated positions in response to the presence or absence of a magnetic field;

a pair of fiber optic cables sealingly extending into said envelope; and alignment means comprising first and second support members mounted respectively to inner ends of said first and second reed arms and rigidly securing respective fiber optic cable inner ends to provide coaxial alignment thereof and complete an optical circuit through the gap therebetween when said reed arms are in said actuated position;

one of said first reed arm and said first support member being stopped against one of said second reed arm and said second support member when said reed arms are in said actuated position to afford accuracy of said coaxial alignment of said facing fiber optic cable inner ends.

11. A fiber optic reed switch comprising:

a hermetically sealed envelope;

first and second magnetically permeable cantilever reed arms sealingly mounted at opposite ends of said envelope and extending thereinto in partially overlapped relation, the inner ends of said reed arms being vertically reciprocal into and out of engagement in response to the presence or absence of a magnetic field;

first and second fiber optic cables sealingly extending into said envelope through said opposite ends thereof;

a first support member attached to the top of said first reed arm at the inner end thereof, the inner end of said first fiber optic cable being rigidly secured to said first supported member; and a second support member attached to the top of said second reed arm and spaced slightly from the inner end thereof to allow clearance of said first reed arm upon closure, the inner end of said second fiber optic cable being rigidly secured to said second support member;

the vertical height of the inner end of said second fiber optic cable above said second reed arm being equal to the vertical height of the inner end of said first fiber optic cable above said first reed arm plus the vertical thickness of said first reed arm, whereby upon engagement of the bottom of said first reed arm with the top of said second reed arm, the facing inner ends of said fiber optic cables are coaxially aligned to complete an optical circuit through the gap therebetween.

12. The switch according to claim 11 further comprising:

a third fiber optic cable sealing mounted to and extending into said envelope; and a third support member mounted in said envelope and rigidly securing the inner end of said third fiber optic cable such that the facing inner ends of said first and third fiber optic cables are coaxially aligned when said first reed arm moves to an alternate reciprocated position out of engagement with said second reed arm.

* * * * *